United States Patent
Paakkinen et al.

(10) Patent No.: US 9,447,770 B2
(45) Date of Patent: Sep. 20, 2016

(54) METHOD FOR CONVERTING THE ENERGY OF WATER WAVES INTO ELECTRICITY BY MEANS OF A WAVE POWER PLANT AND A WAVE POWER PLANT

(71) Applicant: Wello Oy, Espoo (FI)

(72) Inventors: Heikki Paakkinen, Espoo (FI); Antti Paakkinen, Espoo (FI)

(73) Assignee: WELLO OY, Espoo (FI)

( * ) Notice: Subject to any disclaimer, the term of this patent is extended or adjusted under 35 U.S.C. 154(b) by 50 days.

(21) Appl. No.: 14/394,721

(22) PCT Filed: Apr. 12, 2013

(86) PCT No.: PCT/FI2013/050402
§ 371 (c)(1),
(2) Date: Oct. 15, 2014

(87) PCT Pub. No.: WO2013/156674
PCT Pub. Date: Oct. 24, 2013

(65) Prior Publication Data
US 2015/0069760 A1    Mar. 12, 2015

(30) Foreign Application Priority Data
Apr. 17, 2012 (FI) .................................... 20125413

(51) Int. Cl.
F03B 13/20    (2006.01)
E02B 9/08    (2006.01)
F03B 13/16    (2006.01)

(52) U.S. Cl.
CPC ............... *F03B 13/20* (2013.01); *E02B 9/08* (2013.01); *F03B 13/16* (2013.01); *Y02E 10/38* (2013.01)

(58) Field of Classification Search
CPC .......... F03B 13/20; F03B 13/16; E02B 9/08; Y02E 10/38
See application file for complete search history.

(56) References Cited

U.S. PATENT DOCUMENTS

| 4,266,143 A * | 5/1981 | Ng ........................ F03B 13/20 290/42 |
| 4,352,023 A * | 9/1982 | Sachs .................... F03B 13/20 290/42 |
| 7,375,436 B1 * | 5/2008 | Goldin .................. F03B 13/14 290/1 R |

(Continued)

FOREIGN PATENT DOCUMENTS

| EP | 1 384 824 B1 | 5/2006 |
| GB | 2 248 689 A | 4/1992 |

(Continued)

OTHER PUBLICATIONS

International Search Report for PCT Application No. PCT/FI2013/050402 dated Oct. 29, 2013.

(Continued)

*Primary Examiner* — Tulsidas C Patel
*Assistant Examiner* — Viet Nguyen
(74) *Attorney, Agent, or Firm* — Knobbe Martens Olson & Bear LLP

(57) ABSTRACT

A method for converting the energy of water waves into electricity by means of a wave power plant, which comprises a floating body (1), a rotator (3) which is supported on the body and rotates around a rotator shaft (2) which is on average vertical, a gyro (5) which rotates around a gyro shaft (4) which is on average horizontal, the gyro and the gyro shaft rotating with the rotator around the rotator shaft (2), and at least one generator (6), which is connected to rotate together with the gyro or the rotator. By means of the rotator's mass (M) is produced a moment rotating the rotator on the one hand by means of the inclination moment generated by the inclination of the body and gravitation, and on the other hand by means of the acceleration moment generated by the horizontal acceleration of the rotator shaft (2). The inclination and acceleration are caused by directing the internal flows of the wave at the submerged part of the body (1). The moment generated by gyro force is used to equalize the said inclination and acceleration moments during the revolution and the kinetic energy of the gyro is used as an energy reserve to equalize the effective output of the wave power plant.

16 Claims, 5 Drawing Sheets

(56) References Cited

U.S. PATENT DOCUMENTS

| | | | | |
|---|---|---|---|---|
| 2004/0134190 A1* | 7/2004 | Kanki | | F03B 13/18 60/398 |
| 2009/0322080 A1* | 12/2009 | Ruiz Minguela | | F03B 13/16 290/42 |
| 2010/0092242 A1* | 4/2010 | Rasmussen | | E03B 9/08 405/77 |
| 2010/0148509 A1* | 6/2010 | Ortiz | | F03B 13/22 290/53 |
| 2010/0207392 A1* | 8/2010 | Bender | | F03B 13/186 290/53 |
| 2011/0265468 A1* | 11/2011 | Paakkinen | | F03B 13/20 60/499 |
| 2013/0125541 A1* | 5/2013 | Paakkinen | | F03B 13/16 60/506 |

FOREIGN PATENT DOCUMENTS

| | | |
|---|---|---|
| GB | 2 410 299 A | 7/2005 |
| SE | 505711 C2 | 9/1997 |
| WO | WO 2005/071257 A1 | 8/2005 |
| WO | WO 2010/034888 | 4/2010 |

OTHER PUBLICATIONS

Finnish Search Report from patent application No. 20125413 dated Feb. 2, 2013.

* cited by examiner

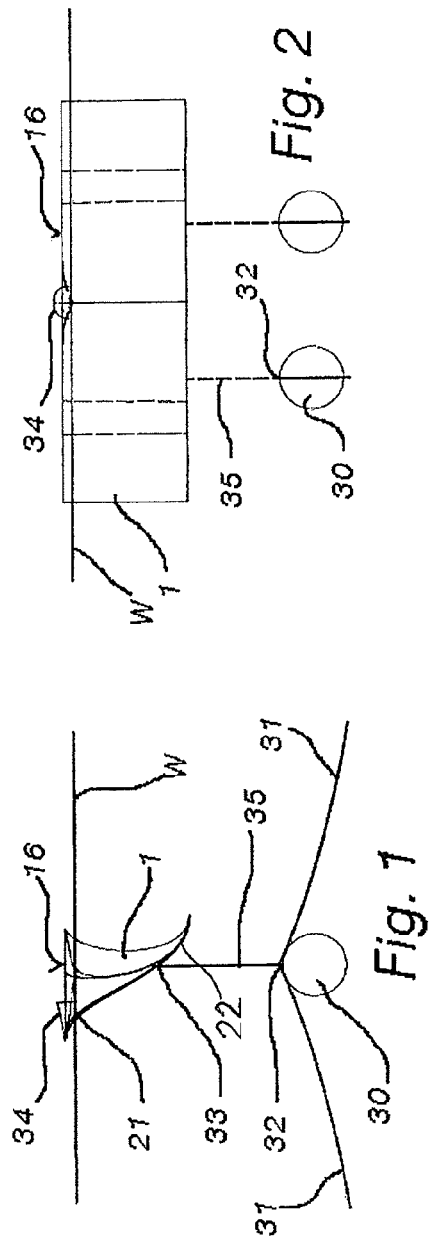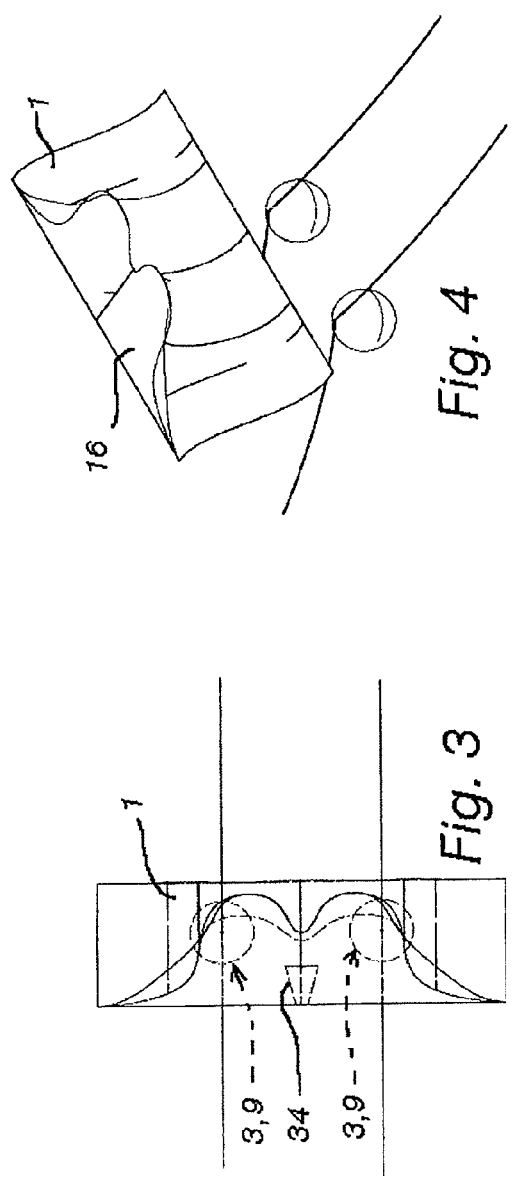

METHOD FOR CONVERTING THE ENERGY OF WATER WAVES INTO ELECTRICITY BY MEANS OF A WAVE POWER PLANT AND A WAVE POWER PLANT

The invention relates to a method for converting the energy of water waves into electricity by means of a wave power plant. The invention also relates to the wave power plant.

From the publications EP 1 384 824 B1 and WO2005/071257 A1, a similar method is known in which moment of momentum of a rotation of a gyro is used to generate torque to rotate a rotator when the gyro shaft is rolled by means of the waves. The problem with these known wave power plants is that the torque enhancing the rotation of the rotator shaft is received on it only for a short time, twice during a full rotation of the rotator, whereas at the intermediate stages, when the gyro shaft turns, the moment of momentum of the rotation of the gyro generates torque which inclines the body. If the body is able to incline in the direction of the torque, it will perform unnecessary work and brake the rotation of the rotator. It is thus difficult to make the rotator rotate in step with the waves and it is difficult to make the body of the wave power plant roll in step with the waves. The operation of the wave power plant is relatively inefficient and it is difficult to make the power plant function in irregular waves.

From the publication U.S. Pat. No. 7,375,436 B1, it is further known that a wave power plant, wherein the moment produced by the gyro force, which is generated when the power plant inclines (rolls), is used for rotating the rotator. In the publication, it is studied the power output of the plant with different rotation speeds of the gyro in relation to wave frequency. The moment rotating the rotator is obtained pulsatingly twice during the revolution, that is, it is irregular and it is difficult to synchronise the rotation of the rotator with the frequency of the wave in varying wave conditions. The effective output is also modest. The output is deteriorated especially by the fact that the floating body inclines according to the direction of the surface of the wave, whereby the moments produced by horizontal accelerations occur at a stage where they, for the most part, cancel the moments produced by inclination and gravitation. Thus, only the gyro force can be utilized.

The aim of the present invention is to provide an improved method and a wave power plant by means of which the problems of the above-mentioned known wave power plants can be solved. The aim of the invention is especially to improve the effective output and operational preconditions of the wave power plant in varying wave conditions. For this purpose, the idea of the invention has been to create conditions for the inclination of the body and the horizontal accelerations to coincide. At such stage, the moments of inclination/gravitation and acceleration will intensify one another and in addition coincide at a push-pull phase with the gyro force moment, thus providing a high and relatively uniform moment and a good effective output.

This aim is achieved with the method according to the invention. The aim is also achieved by means of the wave power plant according to the invention.

The wave power plant according to the invention produces a relatively uniform output with good efficiency irrespective of the size of the wave, because the length/height dimensions of the most frequently occurring typical natural waves are more or less constant.

In the invention, the inclination of the floating body is caused in a manner deviating from the direction of the surface of the wave by means of the internal flows of the wave, which are directed at the submerged part of the body. This submerged part of the body extends so deep down that the internal opposing flows of the wave occur at different heights of the body, on different sides of the body. In this case, the inclination moment and the acceleration moment intensify one another and coincide at a push-pull phase with the gyro moment.

In the wave power plant according to the invention, a rotator suitable for gravitational power take-off may be substantially lighter than, for example, in the wave power plant disclosed in the publication WO2010/034888, because a part of the rotator's torque is generated by the moment of momentum (spin angular momentum) of the gyro. With the invention, it achieves particularly great ad-vantage with respect to known wave power plants due to the fact that the moments produced by inclination and acceleration are summed up into a dead mass torque and the torque generated by the gyro and the torque generated by the dead mass alternate during the revolution of the rotator and each torque acts twice during a revolution, whereby torques repeated typically at approximately 90° intervals are obtained, which aim to rotate the rotator in the same direction of rotation. The direction of rotation of the gyro determines the direction of rotation of the rotator, which is thus selectable.

When the body is designed as a vertical or an inclined wall submerged sufficiently deep, by utilizing the internal flows of the wave, the inclination stage of the body can be made such that also the moment produced by horizontal acceleration can be utilized, which is not possible with bodies floating according to the direction of the wave surface. By means of the invention, a torque is also obtained as uniform and efficient as possible for the duration of the whole revolution.

The invention is described in greater detail in the following, with reference to the accompanying drawings, in which:

FIG. 1 shows a diagrammatic side view of the body of the wave power plant according to one embodiment of the invention;

FIG. 2 shows a front view of the body according to FIG. 1;

FIG. 3 shows a top view of the body according to FIG. 1;

FIG. 4 shows a top rear perspective view of the body according to FIG. 1;

Figure 5:
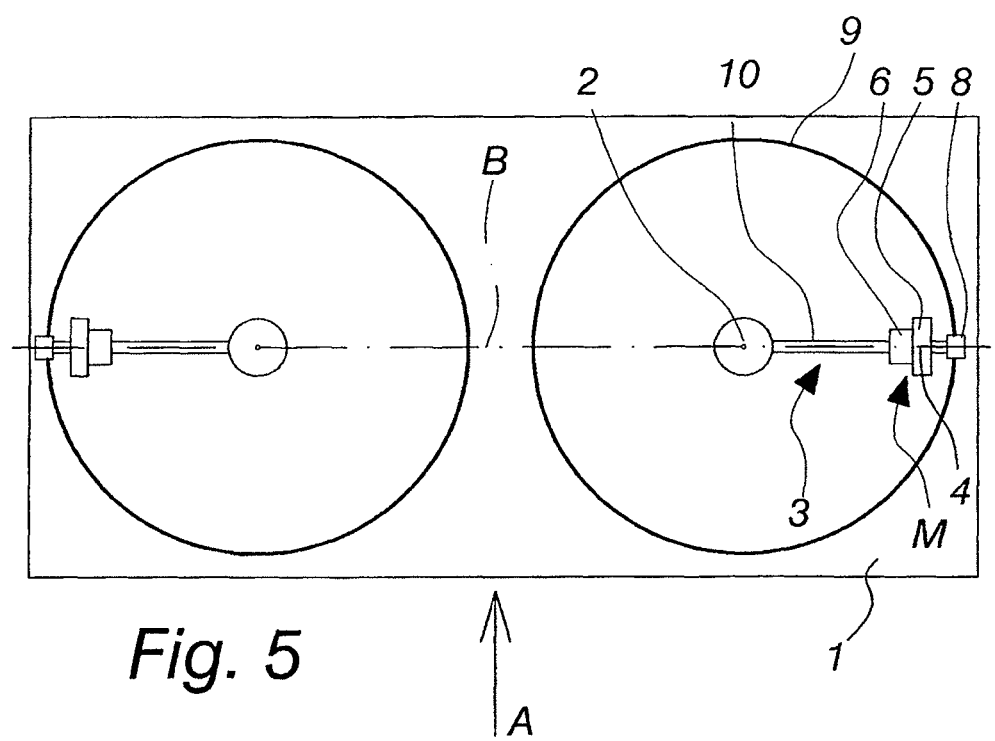
FIG. 5 shows a diagrammatic top view of the power plant units of the wave power plant according to one embodiment of the invention.

FIGS. 1 to 4 show a diagrammatic view in principle of a preferred embodiment of the body 1 of the wave power plant. The body 1 is a wall which is substantially in vertical. When in operation, the body 1 is inclined on average in the incoming direction of the wave, while the most part is below the water level W, but its upper part is above the water level. The wall-type shape body being substantially in vertical or inclined position converts the flow energy of the waves into kinetic energy of the body efficiently utilizing a large surface area. The draught of the body 1 is preferably dimensioned to correspond to 0.5×the length of the smallest functional wave desired, thus equaling the movement of the said wave in the vertical direction. The vertical dimension of the submerged part of the body is typically greater than the horizontal dimension of the cross-section. In the preferred embodiment presented, the general shape of the cross-section of the body is a triangle, the shortest leg 16 of which is above water level and one long leg is in the shape of a gently sloping letter S. The body tapers downwards and over 80% of the height of the body is submerged when the body is in calm water. In the exemplary embodiment according to the Figures, the upper part 21 of the front side of the body 1 facing towards the main incoming direction A of the waves is designed to curve forward and the lower part 22 to curve backwards, thus forming a gently sloping letter S in cross-section. In that case, the propagating wave meets the wave of the upper and lower part of the body at different stages, whereby as the wave propagates, the upper end and lower end of the device are mostly at different stages of the wave. In these areas, forces are then generated to move in opposite directions due to buoyancy and the kinetic movement (flow) of the wave. In a small wave, there is practically no wave motion in the lower part of the device, whereupon the stationary water resists the movement of this part. The purpose of the design of the upper part is that the variation in buoyancy caused by the vertical movement of the wave together with the pressure variation caused by the kinetic movement will move the upper part of the body in different directions in stages: up, to the rear, down and to the front. When the lower part is in contact with a part of a wave which is substantially at a different stage, the force generated by this kinetic pressure change (flow) moves it mainly in a direction opposite to the upper part. When the rotator 3 is located in the upper part of the body 1 and the anchoring point 33 in the lower part of the body, substantial horizontal accelerations are directed at the rotator as the body inclines due to the effect of the internal flow of the wave. The upper surface 16 of the body 1 is closed.

Figure 6:
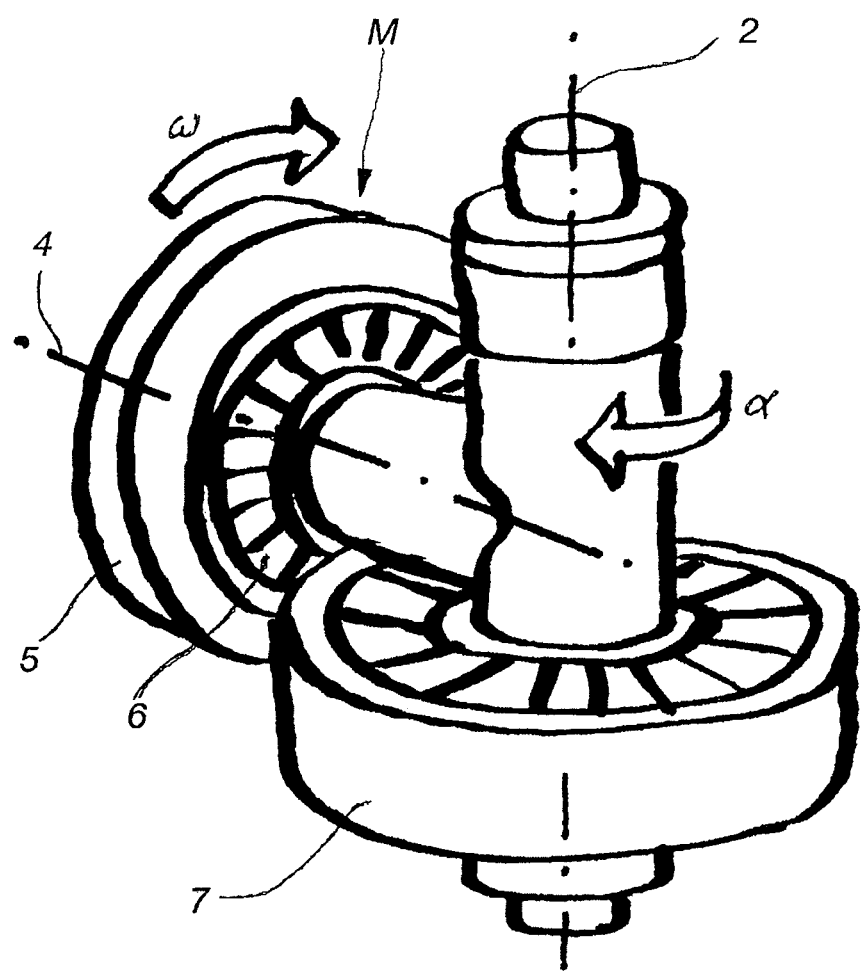
FIG. 6 shows a perspective view of a rotator (without a floating body) in the power plant unit of the wave power plant according to another embodiment of the invention.

The embodiment shown comprises two of the units described more closely in FIGS. 5 and 6. The anchoring is preferably fixed to a low-movement position 33 in the lower part of the device, whereby the anchor forces and movements are easy to control. The anchor force participates in bringing about the movement of the body/generating the force and its energy is recovered. In the example case, the anchoring is implemented with weights 30 suspended below the device. In connection with the weights, elongated anchoring means 31 are arranged extending transversely so as to be connected to the bottom of the installation site of the wave power plant. The weights give the anchoring flexibility and form a lower pivot 32 for the system in case of big waves. In small waves, the pivot is at the anchoring attachment point 33 on the body. With this arrangement, the system adjusts to the energies generated by waves of different sizes. The movements in the system are very small and also the variations in force remain moderate. In addition to the spherical shape shown in the Figures, the weights of the anchoring may also have, for example, a flat or disc form shape, which enhances the utilization of the anchor force in creating movement and producing energy.

The anchoring weights 30 are preferably hollow, for example, filled partly with concrete and partly with air, whereby they float during transport. When the cavity is filled with water, the weights sink and at the same time pull the floating power plant into the correct position. When the device is removed, the cavities of the weights are filled with air, whereby they will again float to facilitate transport. The power plant itself will then also rise close to the surface, into a horizontal position, in which case the draught is small, thus facilitating, for example, docking. The anchor forces are utilized in energy production. The force is mainly opposite to the direction of movement (force) of the upper front part of the body, whereby it enhances energy production for its part.

The interface of the electric cable (not shown) with the body is preferably also located in a low-movement position in the vicinity of the anchoring point and led to the bottom of the sea following the anchor lines to minimise movements, where its wear is slight. The device may be made large because its width is selectable. The output is as high as several megawatts, the irregularity of the wave forming a certain limit to the width of the body. The height of the body may be, for example, within the range from 10 to 40 m, preferably about 15 to 25 m, and the length, for example, within the range from 30 to 100 m, preferably about 50 to 75 m. These are only examples of the dimensions of the device describing its order of magnitude for making high power output possible. A large size is possible because the forces are converted into electric power inside a closed body.

The counterforce of the wave force in generating the torque is gravitation and gyro force, as well as inertial force which mainly resists horizontal accelerations. The maximum points of gravitation and gyro force alternate and the forces occur simultaneously. The forces used to produce electricity (gravitational force, gyro force and variable acceleration in different directions generated by the wave motion) are applied to the inside of the closed body. This makes it possible to have a simple mechanism which is protected from the marine atmosphere and sea water. There are no moving mechanisms outside the closed body.

The dimensions of the device in elevation and in the lateral direction are large compared to the size of the wave, whereby the opposite stages in the wave can be utilized. The device utilizes simultaneously changes of buoyancy and the kinetic energy of the wave in all directions. For utilizing the change of buoyancy, that is, vertical accelerations, it is preferable to position the vertical rotator shaft 2 slightly to the side, into an inclined position.

The device preferably has a beaching ramp for safely receiving a service boat. From an upper part of the ramp a floating rope which is used via a winch to facilitate beaching extends in backwards. A front of the ramp is facing the incoming direction side of the wave, and a shield 34 through which a service entrance is provided thereto.

Figure 8:
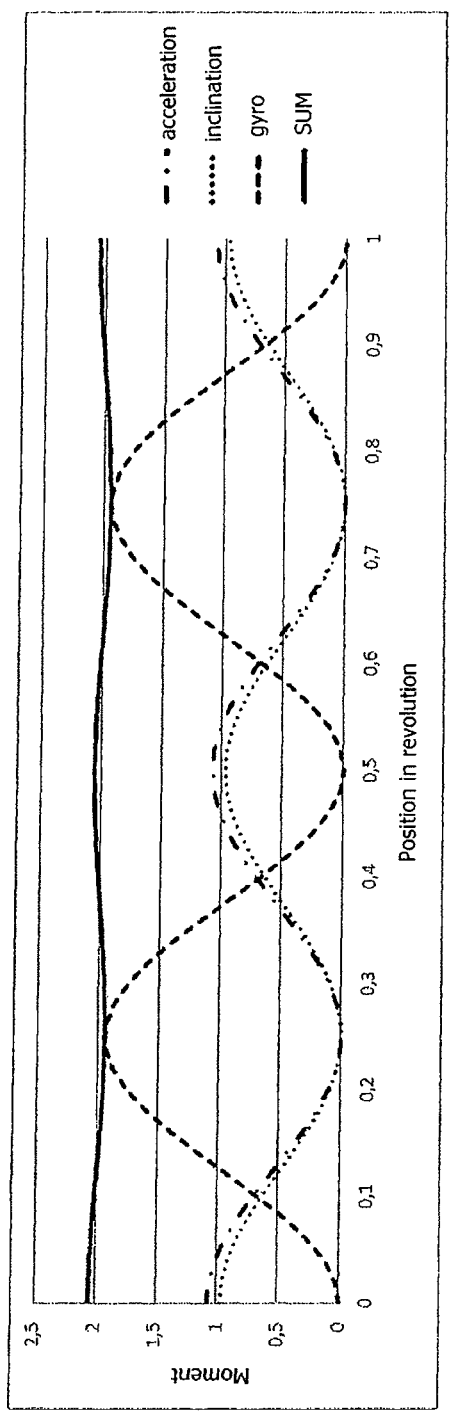
FIG. 8 shows the respective components of the torque generated by the wave power plant according to the invention as a function of the position of the rotator in the revolution.

In the embodiment shown in FIG. 5, an elongated floating body 1 rolls to and fro around the elongated roll axis B of the body. The roll axis B is at a substantial distance below the orbital plane of the power plant unit's rotators. This distance is at least as long as the rotator arm, or preferably its multiple, so that horizontal accelerations can be utilize efficiently. This is not an actual roll axis, because in different wave conditions and with different ways of anchoring, the location of the roll axis B may vary and it may also move during rolling. What is essential is that as a result of the inclination of the body, the orbital plane of the rotator 3 inclines with respect to the horizontal plane and at the same time reciprocating accelerations are directed at the rotator 3. Due to the design of the floating body as a deeply submerged vertical wall, the moment produced by the inclination and gravity and the moment produced by horizontal acceleration occur at essentially the same time and in the same direction. Their sum of each moment alternates with the moment produced by the gyro, as shown in FIG. 8. By dimensioning the moments suitably with one another, the obtained sum of all three moments is a relatively uniform. The dimensioning can be influenced, for example, by the mass of the rotator and the length of the rotator arm, as well as by the mass and the speed of rotation of the gyro. During the operation of the wave power plant, the mutual timing and magnitude of the moments can be influenced by regulating the speed of rotation of the gyro and by adjusting the angular position of the rotator with respect to the direction of inclination. The latter can be adjusted by the loading of the generator and also by regulating the speed of rotation of the gyro.

In FIG. 5, the incoming direction A of the waves is perpendicular to the roll axis B of the body 1. On the body, two or more power plant units which convert wave energy into electricity are positioned. Both power plant units comprise a rotator 3 which rotates on average around a mainly vertical rotator shaft 2. The rotator 3 comprises a gyro 5 which rotates on average around a mainly horizontal gyro shaft 4. The gyro 5 and the gyro shaft 4 rotate around the rotator shaft 2 with the rotator 3. The generator 6 is connected to rotate together with the gyro. The rotator 3 comprises a mass M, the centre of gravity of which is at a distance from the rotator shaft 2, whereupon when the body inclines, the mass M and gyro 5 alternately generate a parallel torque on the rotator 3, as described in greater detail below. The mass M is connected to the rotator shaft 2 with a rotator arm 10 essentially parallel to the axis of rotation 4 of the gyro. The gyro 5 and the generator 6 form the dead mass M partly or completely.

The generator 6 is located on the gyro shaft 4 or connected to be driven by the gyro shaft. The outer end of the rotator 3, which is at a distance from the rotator shaft 2, is provided with a small wheel 8 on which the outer end of the rotator rests and which rotates without sliding along a circular track 9 which surrounds the rotator shaft 2 coaxially. The wheel 8, the gyro 5 and the generator 6 are connected to rotate together. They may be on the same shaft or connected with appropriate transmission ratios to one another. The transmission ratio must be sufficient to give the gyro a speed of rotation which is at least 20 times, typically 40-100 times the speed of rotation of the rotator. In this embodiment, contrary to the embodiment of FIGS. 5 and 6 described below, the speed of rotation of the gyro is constant with respect to the speed of rotation of the rotator 3 around the rotator shaft 2 and correspondingly constant with respect to the period of the waves. In this embodiment, only one generator 6 is required in each power plant unit. The gyro 5 and the generator 6 may be located close to the outer end of the rotator, whereby they form an essential part of the mass M which rotates the rotator on the basis of gravity, when the mass attempts to move in the direction in which the body is inclined.

The moment of momentum of the rotating gyro 5 also generates a torque enhancing the rotation of the rotator 3 when the rolling of the body 1 turns the gyro shaft 4, whereupon the precession force generates a torque in the rotator, the direction of which is at a 90 degree angle to the direction of turning. The direction of rotation of the gyro must be such that the gyro, as it were, ro-tates/advances in the direction of rotation of the rotator.

When the angle of inclination of the body 1 is at its largest and its rolling direction turns, the rotator preferably has the direction shown in FIG. 5, which is the same as the direction of the roll axis B. In this case, the angle between the direction of the rotator and direction of inclination of the body, that is, the so-called phase lag is 90 degrees. In other words, the rotator is at a 90 degree lag (behind) with respect to the inclination of the body. The mass M then gives the best torque due to the effect of gravity. The gyro 5, on the other hand, does not affect the torque of the rotator 3 on the plane of the track 9 at this stage, because the roll axis B and the gyro shaft 4 are parallel. The moment producing the horizontal acceleration is then at its greatest, because the direction of inclination changes, that is, the deceleration changes to acceleration. Due to the vertical height of the body and the submersion, the body inclines by the force of internal flows of the wave at a different stage than it would if it was inclining in the direction of the surface. As a result of this, the moment of the horizontal acceleration occurs at essentially the same stage as the moment produced by the inclination, whereby they intensify and do not cancel out one another.

When the rotator 3 continues to rotate towards the direction in which the gyro shaft 4 is perpendicular to the roll axis B, the rolling motion turns the gyro shaft increasingly faster. The change of direction of the gyro shaft 4 is at its fastest when the shaft 4 is perpendicular to the roll axis B, whereupon the moment of the gyro force pushes the rotator with its maximum force in the direction of the track 9. The rolling motion of the body is then at its fastest and the plane of the track is essentially horizontal. In that case, the mass M does not increase the torque. The torques of the gyro force and the mass, therefore, has 90 degree angular phase difference and are, respectively, at their maximum at angular intervals of 180 degrees, that is, both twice during one revolution of the rotator.

The most powerful operation is thus achieved when the said phase lag is adjusted to 90 degrees. In the intermediate forms, the moment produced by the mass and the moment produced by the gyro on the rotator is proportional to the sine of the phase lag. The phase lag can be adjusted by adjusting the generator 6 load. In the operation of the wave power plant, its output can thus be adjusted by varying the phase lag between 0 to 90 degrees, and in addition by adjusting the speed of rotation of the gyro. In the operating conditions, it is preferable to maintain the set value of the phase lag within the range from 90 to 60 degrees. In other words, in the extreme position of inclination of the body, the aim is to have the direction of the rotator 3 and gyro shaft 4 at a 0 to 40 degree angle to the roll axis B.

The power plant unit according to FIG. 6 differs from the power plant unit of FIG. 1 mainly in that the actual power take-off generator 7 is mounted on the rotator shaft 2. An electric machine 6' mounted on the gyro shaft 4 functions mainly as a motor, and the gyro 5 provides the desired speed of rotation, which is regulated, for example, by means of the regulation device shown in FIG. 7 (which is described in greater detail below). The main principle is that the stronger the waves, the higher the speed of rotation provided to the gyro 5. The gyro thus acts as a regulator of the dead weight or mass M, which controls the operation of the power plant in accordance with the force of the waves. The solution of FIG. 6 differs from FIG. 5 also in that the rotation of the gyro 5 and the electric machine 6' is not connected to the rotation of the roll 8 rotating on the track 9, as in FIG. 5, but their rotation is regulated for the above purpose.

Adapting the rolling frequency of the body to the wave frequency can be done by regulating the speed of the gyro 5 and the phase angle α of the rotator with respect to the inclination of the body. These provide advantageous and wide-range adjustability.

Figure 7:
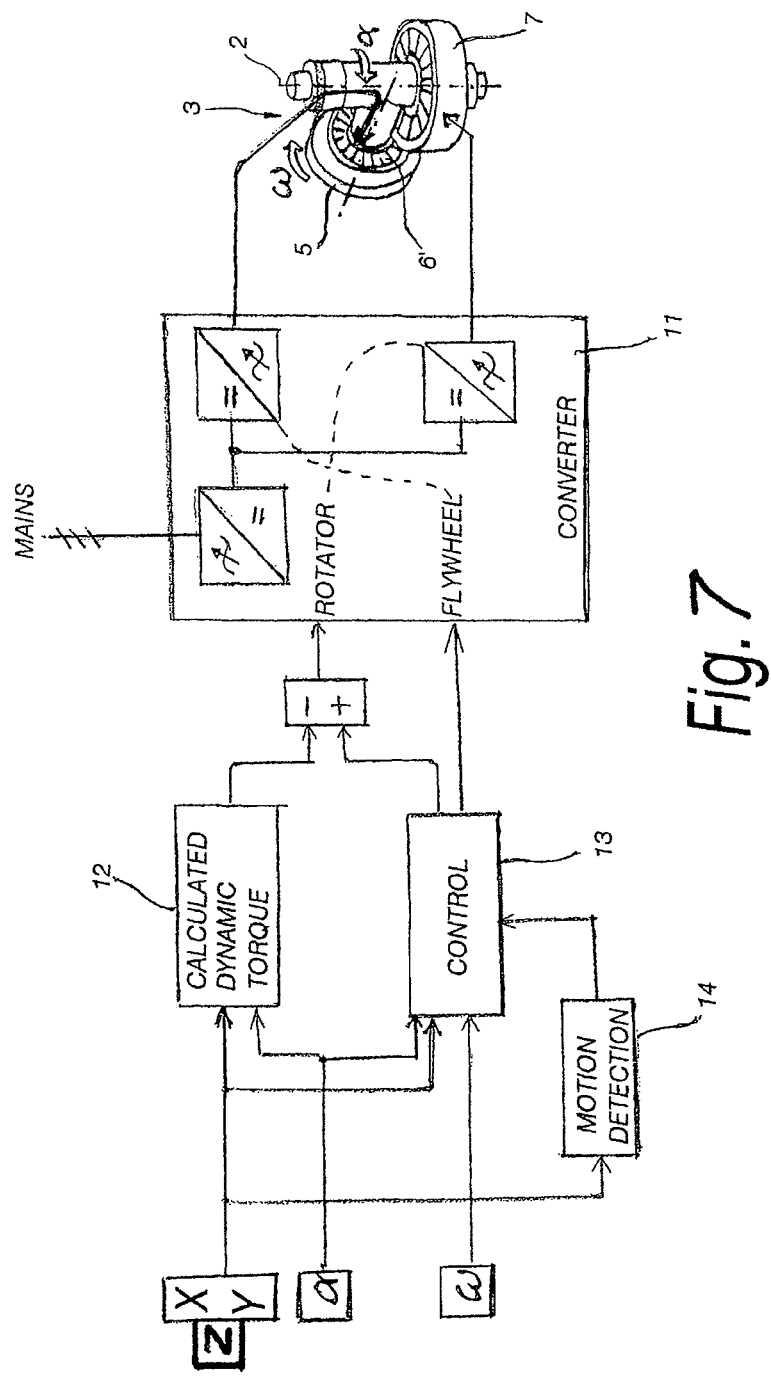
FIG. 7 shows a block diagram of the wave power plant of FIG. 6.

As an input data, the X, Y and Z accelerations of the body of the wave power plant, the direction or direction angle α of the rotator 3 with respect to the incoming direction A of the waves, that is, the normal of the roll axis B with maximum inclination of the body, and the angular speed ω of the gyro are entered the control device shown in FIG. 7. The X and Y accelerations are determined with respect to the centre of gravity of the rotator mass, when the Z axis is fixed so as to be parallel with the rotator shaft. On the basis of the X, Y and Z accelerations and the direction angle α of the rotator, the unit 12 calculates the dynamic torque, by means of which the mass M aims to turn the rotator around the shaft 2. For optimal operation, it is also important to know the phase lag of the direction angle α of the rotator, that is, the angle between the resultant of the X and Y accelerations and the direction angle α. This is calculated in the control unit 13 on the basis of the X-Y resultant direction given by the motion detection unit 14. If the rolling is uniaxial, as in FIG. 5, it suffices to detect only the magnitude of the angle of inclination and direction and magnitude of acceleration with respect to one roll axis B. On the basis of the torque and the phase lag, the unit 13 gives the converter 11 a control and then the converter regulates the generator 7 load in such a way that the rotator rotates in step with the waves and the phase lag is as desired, for example, 90 degrees. In addition, the phase lag received from the control unit 13 is input data for the part of the converter 11 which regulates the speed of rotation of the gyro 5 via the electric machine 6'. The operation of the converter 11 may be based on frequency converters. The generator 7 supplies electric power to the mains and, if necessary, also directly to the motor 6'. At least in the start-up situation, the motor 6' is also powered by the mains. When the gyro is decelerated, the motor 6' may function as a generator and supply electric power to the mains.

In the embodiments shown, the gyro 5 is located eccentrically with respect to the shaft 2, whereby it forms a part of the eccentric mass M of the rotator. The gyro 5 may also be located concentrically on the rotator shaft 2 which, however, increases the overall weight of the power plant unit, because in that case a corresponding increase of dead mass is required at a distance from the shaft 2. The direction of the shaft 2 changes to different sides of the vertical direction depending on the degree of inclination of the body. It may, therefore, be said that the shaft 2 is on average mainly vertical. In the same way, the gyro shaft 4 is on average mainly horizontal. When the power plant stands in calm water, shaft 2 is essentially vertical and shaft 4 essentially horizontal. The shaft 2 may, however, be slightly inclined to the side or in the front-rear direction in order to be able to utilise vertical accelerations better.

The invention claimed is:

1. A method for converting the energy of water waves into electricity by means of a wave power plant, which comprises a floating body, a rotator having a mass and said rotator being supported on the body and rotates around a rotator shaft which is on average in vertical or slightly inclined to the side, a gyro which rotates around a gyro shaft which is on average horizontal, the gyro and the gyro shaft rotating with the rotator around the rotator shaft, and at least one generator, which is connected to rotate together with the gyro or the rotator, the method comprising:
   rolling the floating body by waves in step with the waves,
   rotating the gyro around the gyro shaft,
   wherein an inclination of the gyro shaft with respect to the horizontal plane is caused as a result of the rolling motion,
   the rotation of the rotator is influenced by torque of the gyro, which follows from the inclination of the gyro shaft,
   moments in the same direction as rotating the rotator by the rotator's mass are produced at the same stage by the inclination moment generated by the inclination of the body and gravitation and by the acceleration moment generated by the horizontal acceleration of the rotator shaft,
   said inclination and acceleration are caused by rolling the body in a direction deviating from the rolling direction according to the direction of the wave surface, which is achieved by directing the internal flows of the wave at the submerged part of the body, which is a mainly in vertical, or when in operation, inclined on average in the incoming direction of the wave, which is transverse to the direction of travel of the waves,
   the lower part of the body is influenced by anchor force which takes part in inclining the body and causing acceleration,
   the moment generated by gyro force is used to equalize the said inclination and acceleration moments during the revolution and the kinetic energy of the gyro is used as an energy reserve to equalize the effective output of the wave power plant, and
   a phase lag of the rotation of the rotator, that is, the angle between the direction of the rotator and the direction of the inclination of the body is adjusted in such a way that the peak of the torque of the gyro coincides with the minimum point of the inclination and acceleration moments.

2. The method as claimed in claim 1, wherein the horizontal acceleration is enhanced by moving the level of an orbital track of the mass upwards to a distance equaling at least the radius of the orbital track from the roll axis of the body.

3. The method as claimed in claim 1, wherein the gyro is rotated at a speed of rotation which is more than 20 times greater than the speed of rotation of the rotator.

4. The method as claimed in claim 1, wherein the phase lag of the rotation of the rotator is adjusted by adjusting the generator load.

5. The method as claimed in claim 1, wherein the phase lag is adjustable within a range of 0-90 degrees to keep the direction of the rotator 0-90 degrees behind the direction of the inclination of the body.

6. The method as claimed in claim 1, wherein the output of the wave power plant is adjusted by varying the phase lag, that is, the angle between the direction of the rotator and the direction of the inclination of the body within 0-90 degrees and in addition by regulating the speed of rotation of the gyro.

7. The method as claimed in claim 1, wherein the gyro is rotated at a speed of rotation which is more than 40 times greater than the speed of rotation of the rotator.

8. The method as claimed in claim 1, wherein the phase lag is adjustable within a range of 60-90 degree to keep the direction of the rotator 60-90 degrees behind the direction of the inclination of the body.

9. A wave power plant comprising:
   a floating body,
   a rotator which is supported on the body and rotates around a rotator shaft which is on average vertical or slightly inclined to the side,
   a gyro which rotates around a gyro shaft which is on average horizontal, the gyro and the gyro shaft rotating with the rotator around the rotator shaft, and
   at least one generator, which is connected to rotate together with the gyro or the rotator,
   wherein:
   the submerged part of the body is a mainly in vertical, or when in operation, the body inclined on average in the incoming direction of the wave, which is transverse to the direction of travel of the waves and the wave extends so deep down that the internal flows of the wave occurring at different heights of the body which cause the body to incline in a direction deviating from the rolling direction according to the direction of the wave surface, the rotator is located in the upper part of the body and an anchoring point in the lower part of the body to utilize an anchor force for producing a movement of the body, the rotator comprises a mass, the center of gravity of which is at a distance from the rotator shaft, and an orbital plane of an orbital track of the said center of gravity is at least at said distance from the anchoring point of the body, whereby when the body inclines, the mass generates cophasal torques by the effect of both gravity and the horizontal acceleration of the rotator shaft in order to rotate the rotator, the gyro is arranged to be used as an equalizer of the said torques during the revolution and as an energy reserve to equalize the effective output of the wave power plant, and the generator is located on the gyro shaft or connected to be driven by the gyro shaft, and the outer end of the rotator, which is at a distance from the rotator shaft, is provided with a small wheel on which the outer end of the rotator rests and which rotates along a circular track which surrounds the rotator shaft coaxially.

10. The wave power plant as claimed in claim 9, wherein the gyro is arranged to be rotated at a speed of rotation which is more than 20 times greater than the speed of rotation of the rotator, and the speed of rotation of the gyro is arranged to be actively adjustable within each revolution of the rotator.

11. The wave power plant as claimed in claim 9, wherein the mass is connected to the rotator shaft with an arm essentially parallel to the axis of rotation of the gyro.

12. The wave power plant as claimed in claim 9, wherein the wheel, the gyro and the generator are connected to rotate together.

13. The wave power plant as claimed in claim 9, wherein the generator load is arranged to be adjusted by a control device which determines the phase lag of the direction of the rotator, that is, the angle between the direction of the rotator and the direction of inclination of the body, and that the set value of the phase lag is adjustable.

14. The wave power plant as claimed in claim 9, wherein the gyro is arranged to be rotated at a speed of rotation which is more than 40 times greater than the speed of rotation of the rotator, and the speed of rotation of the gyro is arranged to be actively adjustable within each revolution of the rotator.

15. A wave power plant comprising:

a floating body, a rotator which is supported on the body and rotates around a rotator shaft which is on average vertical or slightly inclined to the side, a gyro which rotates around a gyro shaft which is on average horizontal, the gyro and the gyro shaft rotating with the rotator around the rotator shaft, and at least one generator, which is connected to rotate together with the gyro or the rotator, wherein:

the submerged part of the body is a mainly in vertical, or when in operation, the body inclined on average in the incoming direction of the wave, which is transverse to the direction of travel of the waves and the wave extends so deep down that the internal flows of the wave occurring at different heights of the body which cause the body to incline in a direction deviating from the rolling direction according to the direction of the wave surface, the rotator is located in the upper part of the body and an anchoring point in the lower part of the body to utilize an anchor force for producing a movement of the body, the rotator comprises a mass, the center of gravity of which is at a distance from the rotator shaft, and an orbital plane of an orbital track of the said center of gravity is at least at said distance from the anchoring point of the body, whereby when the body inclines, the mass generates cophasal torques by the effect of both gravity and the horizontal acceleration of the rotator shaft in order to rotate the rotator, the gyro is arranged to be used as an equalizer of the said torques during the revolution and as an energy reserve to equalize the effective output of the wave power plant, when the wave power plant is in operation, the body rolls to and fro with respect to one roll axis, and the wave power plant further comprises a control device with which the generator load and/or the speed of rotation of the gyro are arranged to be adjusted, and the control device is configured, in the extreme position of inclination of the body, to have the direction of the rotator and gyro shaft at a 0 to 40 degree angle to the roll axis, that is, a set value of the angle between the direction of the rotator and the direction of inclination of the body, that is, of the phase lag, is 90 to 60 degrees.

16. A wave power plant comprising:

a floating body, a rotator which is supported on the body and rotates around a rotator shaft which is on average vertical or slightly inclined to the side, a gyro which rotates around a gyro shaft which is on average horizontal, the gyro and the gyro shaft rotating with the rotator around the rotator shaft, and at least one generator, which is connected to rotate together with the gyro or the rotator, wherein:

the submerged part of the body is a mainly in vertical, or when in operation, the body inclined on average in the incoming direction of the wave, which is transverse to the direction of travel of the waves and the wave extends so deep down that the internal flows of the wave occurring at different heights of the body which cause the body to incline in a direction deviating from the rolling direction according to the direction of the wave surface, the rotator is located in the upper part of the body and an anchoring point in the lower part of the body to utilize an anchor force for producing a movement of the body, the rotator comprises a mass, the center of gravity of which is at a distance from the rotator shaft, and an orbital plane of an orbital track of the said center of gravity is at least at said distance from the anchoring point of the body, whereby when the body inclines, the mass generates cophasal torques by the effect of both gravity and the horizontal acceleration of the rotator shaft in order to rotate the rotator, the gyro is arranged to be used as an equalizer of the said torques during the revolution and as an energy reserve to equalize the effective output of the wave power plant, the general shape of the cross-section of the body is a triangle, the shortest leg of which is above water level and one long leg is in the shape of a gently sloping letter S, and the body tapers downwards and over 80% of the height of the body is below water level when the body is anchored ready for use in calm water.

\* \* \* \* \*